J. L. WHEELER.
TOTALIZING MEASURING MACHINE.
APPLICATION FILED OCT. 11, 1920.
1,406,126.
Patented Feb. 7, 1922.
2 SHEETS—SHEET 1.
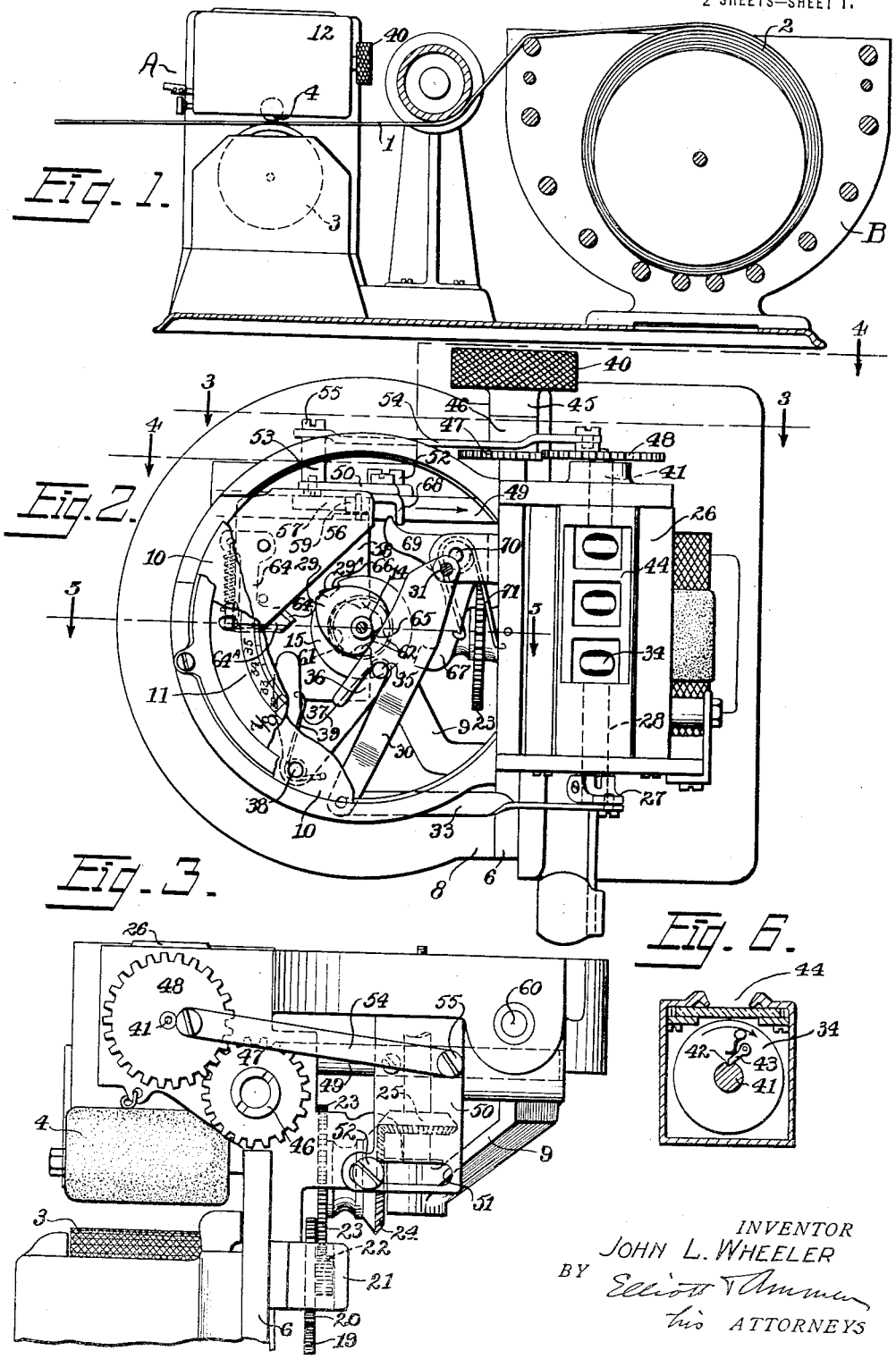
INVENTOR
JOHN L. WHEELER
BY Elliott T. Ammen
his ATTORNEYS

J. L. WHEELER.
TOTALIZING MEASURING MACHINE.
APPLICATION FILED OCT. 11, 1920.

1,406,126.

Patented Feb. 7, 1922.
2 SHEETS—SHEET 2.

INVENTOR
JOHN L. WHEELER
BY Elliott & Annun
his ATTORNEYS

UNITED STATES PATENT OFFICE.

JOHN L. WHEELER, OF ST. LOUIS, MISSOURI, ASSIGNOR TO THE MEASUREGRAPH COMPANY, OF ST. LOUIS, MISSOURI, A CORPORATION OF DELAWARE.

TOTALIZING MEASURING MACHINE.

1,406,126.  Specification of Letters Patent.  Patented Feb. 7, 1922.

Application filed October 11, 1920. Serial No. 416,095.

*To all whom it may concern:*

Be it known that I, JOHN L. WHEELER, a citizen of the United States, residing in city of St. Louis and State of Missouri, have invented new and useful Improvements in Totalizing Measuring Machines, of which the following is a specification.

This invention relates to a measuring machine for measuring the length of any article, for example, a piece of fabric. The general object of the invention is to produce a simple mechanism for indicating fractions of the unit of measure and associated with a totalizer of any suitable construction in such a way that at each revolution of the pointer or other indicating part, the totalizer will be actuated. In this way the totalizer indicates the total number of units or yards measured, while the indicator indicates the fractions of each yard as measured. For the purpose of illustration, the totalizer described in the following specification may be set back to zero by simply rotating its set-back shaft; one of the objects of my invention is to provide means for connecting up the set-back shaft of such a totalizer with the mechanism of the indicator hand so that when the totalizer is set back to zero, the indicator hand will also be set back to zero.

Further objects of the invention will appear hereinafter.

The invention consists in the novel features, and in the general combination of parts to be particularly described hereinafter, all of which contribute to produce a simple and efficient totalizing measuring machine.

A preferred embodiment of my invention will be particularly described in the following specification, while the broad scope of my invention will be pointed out in the appended claims.

In the drawing,

Figure 1 is an elevation and partial section illustrating the manner in which such a machine may be used for measuring fabric, such as tape or ribbon;

Figure 2 is a plan of the machine, certain parts being broken away or shown in section; this view shows the mechanism with the casing removed;

Figure 3 is an elevation taken about on the line 3—3 of Figure 2, and particularly illustrating the connection from the set-back shaft of the totalizer, for setting back the pointer to zero;

Figure 6 is a cross section through the totalizer illustrating the manner in which the set-back shaft operates to set back the counterwheels to zero.

Before proceeding to a detailed description of the invention, it should be stated that it is not limited in its use to fabric measuring machines, but is applicable to any measuring machines or indicators comprising a moving indicating member or pointer, the revolutions of which must be indicated in order to indicate its total movement.

In the present specification I have described the invention as applied to a measuring machine for measuring tape or ribbon. The invention is particularly applicable to such a machine, because it gives the machine a relatively large measuring capacity in a relatively small space. In other words, the invention enables me to produce a very simple compact measuring machine having a high capacity. The machine illustrated will have a capacity of a thousand yards.

Referring more particularly to the parts, A represents a measuring machine embodying my invention, which is illustrated as measuring a web 1 which is being drawn off of a bolt 2 mounted in a bolt holder B.

The measuring machine includes a movable member or roller 3 (see Fig. 1) against which the web 1 is held by means of a presser roller 4 when the web is pulled past the measuring machine. This rotates the movable member or measuring roller 3 and this movement is imparted to the indicating mechanism and the totalizer, which I shall now describe.

Figure 4:
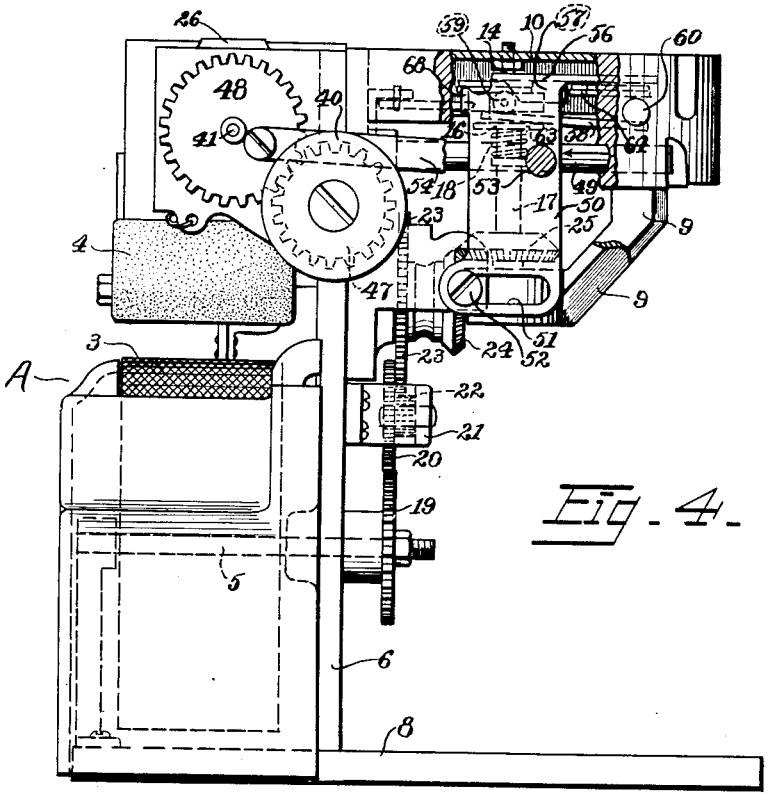
Figure 4 is a side elevation and partial section taken about on the line 4—4 of Figure 2 illustrating the driving mechanism that drives the indicating pointer.
Figure 5:
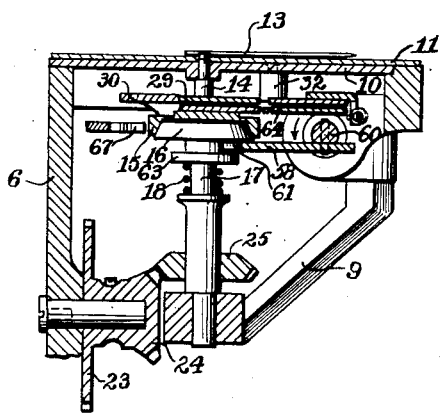
Figure 5 is a partial section taken about on the line 5—5 of Figure 2 and particularly illustrating the clutch controlling means.

The measuring roller is preferably mounted on a horizontal shaft 5 (Fig. 4) carried in a vertical frame plate 6 of the frame 8 of the machine. The upper portion of the frame 8 comprises a spider frame 9 which is supported on the plate 6, and the upper part of this spider frame is of substantially circular form and is surmounted by a plate 10 on which rests the indicating dial 11. (See Figs. 2 and 5.) This dial is formed with a scale to indicate the fractions of the unit of measure, for example, inches and fractions of a yard. This dial 11 is located at the upper side of the casing 12 of the machine which envelops the frame and mechanism.

An indicating pointer 13 is provided (see Fig. 5), which is attached to the upper end of a vertical spindle 14, and this spindle is driven through a clutch comprising a relatively fixed clutch member 15 and a movable clutch member 16, the latter being mounted to move vertically on a shaft 17 to which it is splined. The clutch is normally held closed by a coil spring 18. Any suitable mechanism may be provided for driving the shaft 17 from the shaft 5 of the measuring roller. For this purpose the shaft 5 may be provided with a gear wheel 19, (see Fig. 4) which meshes with an idler 20. This idler is supported in a suitable bracket 21 and carries a rigid pinion 22 which meshes with a gear wheel 23. This gear wheel carries an integral bevel gear 24 which meshes with a bevel gear 25 which is rigid on the lower end of the shaft 17.

I provide means actuated at each rotation of the pointer 13 for actuating a totalizer 26 (see Fig. 2;) this totalizer may be of any suitable construction which may be operated by reciprocating or rocking the actuating arm 27 which is located at one end of the totalizer. The actuating arm 27 of the totalizer is carried by an actuating shaft 28. I prefer to actuate the arm 27 through the agency of a cam 29 (see Fig. 2,) which rotates with the pointer 13. In the present instance this cam is simply rigidly attached to the spindle 14 which carries the pointer. The edge of this cam actuates a lever 30 which is attached by a pivot pin 31, and by means of a downwardly extending post 32 on the underside of plate 10. (See Fig. 5.) The outer end of this lever is connected by a link 33 with the actuating arm 27. The totalizer 26 is of the well-known Veeder type and its number wheels 34 will be advanced by ratchet mechanism, not illustrated, but which is actuated by the actuating arm 27. The lever 30 may be held up against the edge of the cam 29 by means of a pin 35 running in a slot or deep notch 36 formed in the plate 30, the said pin 35 being carried on a spring plate 37 supported on a pivot pin 38 on the underside of the plate 10. This spring plate 37 is pressed by a spring 39 so that it tends to rotate in an anti-clockwise direction. Evidently the effect of this spring will be to hold the lever 30 against the edge of the cam and will return the lever after it has been actuated by the rotation of the cam.

Figure 7:
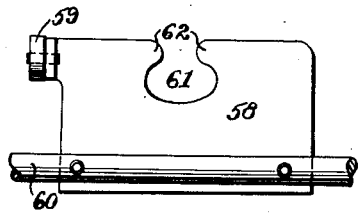
Figure 7 is a plan illustrating details of a rock plate for controlling the clutch through which the pointer is driven.

I provide a hand-operated member, such as a thumb head 40 for setting back the number wheels 34 of the Veeder or totalizer, to the zero position. Totalizers of this type are provided with a set-back shaft 41 located at one end, and the rotation of this shaft operates to return the number wheels to zero. Any suitable construction may be used for this purpose, for example, a construction such as that illustrated in Figure 6, in which 41 represents the set-back shaft and 34 represents one of the number wheels. By rotating the shaft 41 in the same direction in which the number wheels are rotated, when advancing the notch 42 on the shaft engages a pawl 43 on the side of the number wheel. This pawl is spring-pressed, and hence, when the shaft is rotated in this direction the number wheel will be rotated. The pawls 43 are all attached at the proper points to the number wheels so that all the zeros of the number wheels will align when the notch or groove 42 engages all of the pawls. Hence, in setting back, it is simply necessary to continue the rotation until the zeros all appear in the window 44 of the instrument. The thumb head 40 is disposed on the outer side of the casing and carries a sleeve 45 which extends through the casing and engages a corresponding sleeve 46 on a pinion 47 (see Fig. 3;) this pinion 47 meshes with a gear wheel 48 which is rigidly secured on the end of the set-back shaft 41. I utilize the movement of the gear wheel 48 to effect the opening of the clutch 15—16, and I also utilize this movement to set the pointer back to zero. This is preferably accomplished by means of a slide including a slide bar 49 which is mounted to slide in the frame of the instrument in a substantially horizontal direction and in a vertical plane substantially at right angles to the axis of the totalizer 26. The slide also includes a vertical plate 50 which is rigidly secured to the side of the bar and extends downwardly therefrom, the lower end of the plate being provided with a guide slot 51 which receives a guide screw 52 secured in a portion of the frame. This guide screw operates to maintain the plate 50 in a vertical plane. This plate 50 is further provided with an outwardly extending post 53, to the outer end of which a connecting rod 54 is attached by means of a screw 55, the other end of the connecting rod being pivotally attached to the side face of the gear wheel 48 (see Fig. 3). The plate 50 has a substantially triangular upper portion 56 which is disposed in a horizontal plane, and the underside of this horizontal portion 56 is provided near the slide bar 49, with a cam 57. (See Figs. 2 and 4.) When the slide moves in the direction indicated by the arrow in Figures 2 and 4, the cam will effect the opening of the clutch; this is preferably effected by means of a rock plate 58 (see Fig. 7,) which carries a roller 59 near one edge (see Fig. 4,) which roller co-operates with the cam 57. This rock plate is attached to the underside of a rock shaft 60 mounted to rock in the frame of the instrument and is formed near its middle portion with a deep notch 61 adjacent to which opposite noses 62 are formed, and these noses engage the upper side of a collar 63 (see Fig. 5), that is carried by the movable clutch member 16. Now, when this rock plate rocks downwardly the spring 18 will be compressed and the clutch will be opened; this will permit the pointer 13 and its spindle 14 to rotate freely. I utilize the cam 29 in effecting the return or setting back of the pointer 13 to its zero position. This is accomplished by means described in a copending application Serial Number 409,834, filed Sept. 13th, 1920, by Douglas Turner, for fabric measuring and cost computing machines. This means simply consists of a spring pressed dog 64 having a point projecting toward the cam 29. The cam 29 is heart-shaped and when the plate moves in the direction indicated by the arrow in Figure 2, the point of the dog 64 comes against the cam and will rotate the cam until the dog stops in a notch 65 opposite the point of the cam. For practical reasons I provide a second cam 29ª similar to the cam 29 and a second dog 64ª, similar to the dog 64, the points of the two cams being slightly displaced with respect to each other. This prevents any possibility of the point of a dog striking directly upon the point of a cam, the effect of which would be to prevent the rotation of the cam.

When the pointer 13 is in the zero position, a notch 66 in the outer edge of the clutch member 15 lies directly opposite to a detent pawl 67 which is spring pressed and fits into the notch 66 so as to hold the pointer 13 in its zero position. When the machine is in operation the dog or pawl 67 is held away from the edge of the clutch member 15 by means of a dog 68 (see Fig. 2,) which is carried by the slide and which engages an arm 69 rigid with the detent pawl 67. Figure 2 shows the dog 68 holding the detent pawl 67 in its inactive position, but it is evident that if the slide should be moved in the direction indicated by the arrow in Figure 2 the dog 68 would permit the arm 69 to swing in a clockwise direction, thereby rotating the detent pawl 67 on its pivot 70. A spring 71 tends to move the detent pawl 67 toward the clutch member and will finally seat the end of the pawl in the notch 66.

I shall now describe briefly the mode of operation of the entire machine.

When the fabric 1 is pulled past the measuring roller 3, the shaft 5 of the measuring roller drives the vertical shaft 17 through the driving mechanism including the gears 19 to 23 inclusive and the bevel gears 24 and 25. If the clutch composed of the clutch members 15—16 is closed, as it should be, the spindle 14 will be rotated and this will move the pointer 13 around on the face of the dial 11 thereby indicating the number of inches or yard fractions that have been measured. As the spindle 14 rotates, its cam 29 actuates the lever 30 and the link 33 to give the actuating arm 27 of the totalizer 26 a double swing. This will rotate the units number wheel of the Veeder through one number space and indicate that one yard has been measured. As the measuring movement progresses the units number wheel of the Veeder carries to the ten's wheel and the ten's wheel eventually carries to the hundred's wheel. After the measurement has been completed the pointer and the number wheels may be set back to zero by rotating the thumb head 40. This will rotate the set-back shaft 41 in the direction of the arrow in Figure 6; this will "pick up" the number wheels all aligning in the zero position and the rotation will be continued until all of the zeros appear at the window 44. The movement of the thumb head 40 is imparted by the gear wheel 48 through the connecting rod 54 to the slide plate 50. The movement of this slide plate through the operation of the cam 57 rocks the rock plate 58 on its shaft 60 in the direction of the arrow in Figure 5. This actuates the collar 63 to move the clutch member 16 downwardly, thereby opening the clutch. The hand or pointer 13 is now free to rotate, and it will be rotated by the dogs 64, 64ª engaging with the cams 29, 29ª. This will rotate the pointer until the points of these dogs come into the notches 65 of the cams. The pointer will then be at zero, and a further movement of the thumb-head 40 will permit the detent pawl 67 to seat in the notch 66 of the clutch member 15, thereby holding the pointer in the zero position. When the thumb-head 40 is released when the number wheels are all at zero then the dog 68 will be in engagement with the arm 69 and will hold the pawl 67 away from the notch. In this position of the thumb-head the clutch is closed and the machine is ready for operation.

It is understood that the embodiment of the invention described herein is only one of the many embodiments my invention may take, and I do not wish to be limited in the practice of my invention nor in my claims, to the particular embodiment set forth.

What I claim and desire to secure by Letters Patent is:

1. In a measuring machine, the combination of a movable member mounted so as to be driven by the goods being measured, an indicating dial for indicating fractions of the unit of measure, a pointer mounted to rotate over said dial, a clutch for driving the same from the movable member, a cam mounted to rotate with the pointer, a totalizer, means actuated by the cam for actuating the totalizer, a hand-operated member for setting back the totalizer to zero, and means also actuated by the hand operated member for opening the clutch and for setting back the indicating pointer to zero.

2. In a measuring machine, the combination of a movable member mounted so as to be driven by the goods being measured, an indicating dial for indicating fractions of the unit of measure, a pointer mounted to rotate over said dial, a clutch driving the same from the movable member, a cam mounted to rotate with the pointer, a totalizer, means actuated by the cam for actuating the totalizer, a hand-operated member for setting back the totalizer to zero, and means also actuated thereby for opening the clutch and including a part for engaging the cam to rotate the same and thereby set the indicating pointer back to zero.

3. In a measuring machine, the combination of a movable member mounted so as to be driven by the goods being measured, an indicating dial for indicating fractions of the unit of measure, a pointer mounted to rotate over said dial, a cam rigid therewith, a totalizer having an actuating arm, a lever actuated by said cam at each revolution of the pointer, and connected with said arm to actuate the totalizer, a hand-operated member for setting back the totalizer to zero, a clutch for driving the pointer from the movable member, and means also actuated by the hand-operated member for opening the clutch and for setting back the indicating pointer to zero.

4. In a measuring machine, the combination of a movable member mounted so as to be driven by the goods being measured, an indicating dial for indicating fractions of the unit of measure, a pointer mounted to rotate over said dial, a clutch for driving the same from the movable member, a cam mounted to rotate with the pointer, a totalizer, means actuated by the cam for actuating the totalizer, a hand-operated member for setting back the totalizer to zero, a slide connected with the hand-operated member and actuated thereby, and means carried by the slide for opening the clutch and for setting back the indicating pointer to zero.

5. In a measuring machine, the combination of a movable member mounted so as to be driven by the goods being measured, an indicating dial for indicating fractions of the unit of measure, a pointer mounted to rotate over the dial, a clutch for driving the same from the movable member, a cam rigid with the pointer, a pivotally mounted rock plate engaging the clutch for opening the same, a totalizer, means actuated by the cam for actuating the totalizer, a hand-operated member for setting back the totalizer to zero, a slide actuated by the hand-operated member, means carried thereby for actuating the rock plate to open the clutch, and means carried by the slide for setting back the indicating pointer to zero.

6. In a measuring machine, the combination of a movable member mounted so as to be driven by the goods being measured, an indicating dial for indicating fractions of the unit of measure, a pointer mounted to rotate over said dial, a clutch for driving the same from the movable member, a cam mounted to rotate with the pointer, a totalizer, means actuated by the cam for actuating the totalizer, said totalizer including a set-back shaft, a wheel carried by the set-back shaft, a connecting rod attached to said wheel, and means actuated by the connecting rod for opening the clutch and for setting back the indicating pointer to zero.

7. In a measuring machine, the combination of a movable member mounted so as to be driven by the goods being measured, an indicating dial for indicating fractions of the unit of measure, a pointer mounted to rotate over said dial, a clutch for driving the same from the movable member, a cam mounted to rotate with the pointer, a totalizer, means actuated by the cam for actuating the totalizer, said totalizer including a set-back shaft, a wheel carried by the set-back shaft, a connecting rod attached to the wheel, a slide actuated by the connecting rod, a rock plate for opening the clutch, a cam carried by the slide for actuating the rock plate and thereby opening the clutch, and means carried by the slide cooperating with the cam to set back the indicating pointer to zero.

8. In a measuring machine, the combination of a frame, a movable member mounted so as to be driven by the goods being measured, a casing on said frame, a substantially horizontal indicating dial mounted on the upper side of the casing for indicating fractions of the unit of measure, a pointer mounted to rotate over said dial, a clutch for driving the same from the movable member, a cam mounted to rotate with the pointer, a totalizer disposed on a substantially horizontal axis and having an actuating arm at one end, a lever engaging the cam, actuated thereby at each revolution of the pointer, and connected with the actuating arm to actuate the totalizer said totalizer having a set-back shaft at the other end thereof, a wheel carried by the set-back, a slide mounted in the frame to slide in a substantially horizontal plane and in a direction substantially at right angles to the axis of the totalizer, a rock plate pivotally mounted on the frame for opening the clutch, a cam carried by the slide for actuating the rock plate, a hand-operated member for actuating the wheel to set back the totalizer to zero, and means carried by the slide cooperating with the same to set back the indicating pointer to zero.

9. In a measuring machine, the combination of a dial, a pointer mounted to rotate over the dial, a clutch for driving the pointer and including a clutch member rotating with the pointer, a spring-pressed detent pawl opposite the said clutch member, said clutch member having means to cooperate with the detent pawl and hold the same in a fixed position to hold the pointer at zero, a totalizer mechanism, means for actuating the same at each revolution of the pointer, a hand operated member, means actuated thereby to set back the totalizer mechanism to zero, and means also actuated by the hand operated member for controlling the detent pawl, for opening the clutch and for returning the pointer to its zero position.

In testimony whereof, I have hereunto set my hand.

JOHN L. WHEELER.